(12) United States Patent
Yu et al.

(10) Patent No.: US 11,288,417 B2
(45) Date of Patent: Mar. 29, 2022

(54) TOPOLOGY OPTIMIZATION OF STRUCTURE WITH MULTIPLE TARGETS

(71) Applicant: Autodesk, Inc., San Rafael, CA (US)

(72) Inventors: Huagang Yu, Templestowe (AU); Justin Nicholas Hallet, North Warrandyte (AU)

(73) Assignee: Autodesk, Inc., San Rafael, CA (US)

( * ) Notice: Subject to any disclaimer, the term of this patent is extended or adjusted under 35 U.S.C. 154(b) by 310 days.

(21) Appl. No.: 16/392,154

(22) Filed: Apr. 23, 2019

(65) Prior Publication Data
US 2020/0342067 A1    Oct. 29, 2020

(51) Int. Cl.
*G06F 30/20* (2020.01)
*B33Y 50/02* (2015.01)
*B29C 64/386* (2017.01)
*G06F 119/18* (2020.01)

(52) U.S. Cl.
CPC ............ *G06F 30/20* (2020.01); *B29C 64/386* (2017.08); *B33Y 50/02* (2014.12); *G06F 2119/18* (2020.01)

(58) Field of Classification Search
CPC ..... G06F 30/20; G06F 2119/18; B33Y 50/02; B29C 64/386
USPC .......................................................... 703/2
See application file for complete search history.

(56) References Cited

U.S. PATENT DOCUMENTS

| | | | | |
|---|---|---|---|---|
| 6,202,043 | B1 * | 3/2001 | Devoino | G06F 30/20 703/17 |
| 7,277,835 | B2 * | 10/2007 | Spitz | G06T 17/10 345/20 |
| 8,175,734 | B2 * | 5/2012 | Fogel | B33Y 50/00 700/98 |
| 10,354,442 | B2 * | 7/2019 | Hill | G05B 19/4099 |
| 10,467,807 | B1 * | 11/2019 | Strater | B33Y 50/00 |
| 10,606,981 | B2 * | 3/2020 | Benjamin | B64D 11/0023 |

(Continued)

FOREIGN PATENT DOCUMENTS

WO    WO2020069535    4/2020

OTHER PUBLICATIONS

Ullah et al. (A boundary element and level set based topology optimisation using sensitivity analysis, 2016, Engineering analysis with boundary elements., 70 . pp. 80-98). (Year: 2016).*

(Continued)

*Primary Examiner* — Iftekhar A Khan
(74) *Attorney, Agent, or Firm* — Fish & Richardson P.C.

(57) ABSTRACT

Methods, systems, and apparatus, including medium-encoded computer program products, for computer aided design of physical structures, which can be built using various manufacturing systems and techniques, include, in one aspect, a method including: obtaining a design space for a modeled object, design criteria, an in-use load case, one or more materials specifications, and one or more safety factors; producing at least one generatively designed 3D topology of the modeled object, including, starting from an initial design, generating a first design in accordance with a first target defined by a first of the specifications or of the safety factors, and starting from the first design or an intermediate design generated between the initial design and the first design, generating a second design in accordance with a second target defined by a second of the specifications or of the safety factors; and providing both the first design and the second design.

21 Claims, 6 Drawing Sheets

(56) References Cited

U.S. PATENT DOCUMENTS

| | | | | |
|---|---|---|---|---|
| 10,628,532 | B2* | 4/2020 | Cheong | G06N 5/022 |
| 10,635,088 | B1* | 4/2020 | Bandara | B33Y 50/02 |
| 10,909,288 | B2* | 2/2021 | Cheong | G06F 30/3323 |
| 2003/0191554 | A1* | 10/2003 | Russell | G06T 17/20 |
| | | | | 700/187 |
| 2006/0276925 | A1* | 12/2006 | Lin | B33Y 80/00 |
| | | | | 700/118 |
| 2007/0013690 | A1* | 1/2007 | Grimaud | G06T 19/00 |
| | | | | 345/419 |
| 2012/0029882 | A1* | 2/2012 | Bommes | G06F 30/23 |
| | | | | 703/1 |
| 2013/0264749 | A1* | 10/2013 | Jones | G06F 30/00 |
| | | | | 264/497 |
| 2013/0297059 | A1* | 11/2013 | Grifith | G06T 19/20 |
| | | | | 700/98 |
| 2013/0300735 | A1* | 11/2013 | Schmidt | G06T 19/20 |
| | | | | 345/419 |
| 2015/0065868 | A1* | 3/2015 | Liang | A61B 6/5229 |
| | | | | 600/425 |
| 2015/0269282 | A1* | 9/2015 | Nelaturi | G06F 30/17 |
| | | | | 700/98 |
| 2016/0096318 | A1* | 4/2016 | Bickel | B29C 64/106 |
| | | | | 264/40.1 |
| 2016/0101570 | A1* | 4/2016 | Iorio | G05B 19/4099 |
| | | | | 700/98 |
| 2016/0147217 | A1* | 5/2016 | Davis | G06F 16/444 |
| | | | | 700/97 |
| 2018/0046732 | A1* | 2/2018 | Bergin | G06F 30/15 |
| 2018/0285517 | A1* | 10/2018 | Reichental | G06F 30/17 |
| 2019/0001657 | A1* | 1/2019 | Matusik | G06F 30/00 |
| 2019/0005185 | A1* | 1/2019 | D'Antuono | B64F 5/00 |
| 2019/0056715 | A1* | 2/2019 | Su | G06N 20/00 |
| 2019/0079491 | A1* | 3/2019 | Barua | B22F 10/30 |
| 2019/0111590 | A1* | 4/2019 | Trivedi | B29C 64/40 |
| 2019/0130058 | A1* | 5/2019 | Thomas | G06F 30/15 |
| 2019/0130642 | A1* | 5/2019 | Elber | G06T 15/08 |
| 2019/0138670 | A1* | 5/2019 | Bandara | G06F 30/20 |
| 2019/0197198 | A1* | 6/2019 | Cheong | G06F 30/3323 |
| 2019/0197210 | A1* | 6/2019 | Bonner | B29C 64/386 |
| 2019/0294754 | A1* | 9/2019 | Roberts | G06F 30/17 |
| 2020/0050736 | A1* | 2/2020 | Shayani | G06K 9/6256 |
| 2020/0064809 | A1* | 2/2020 | Sanders | G05B 19/404 |
| 2020/0074028 | A1* | 3/2020 | Yang | G06F 30/23 |
| 2020/0143009 | A1* | 5/2020 | Schmidt | G06F 30/17 |
| 2020/0150624 | A1* | 5/2020 | Marinov | G06T 17/00 |
| 2020/0151286 | A1* | 5/2020 | Willis | G06F 30/00 |
| 2020/0265122 | A1* | 8/2020 | Razzell | B29C 64/393 |
| 2020/0320175 | A1* | 10/2020 | Roberts | G06F 30/23 |
| 2020/0342067 | A1* | 10/2020 | Yu | G06F 30/23 |

OTHER PUBLICATIONS

Wang et al. (Level set-based topology optimization with overhang constraint: Towards support-free additive manufacturing, Comput. Methods Appl. Mech. Engrg. 339 (2018) 59 614) (Year: 2018).*

Herrero et al. (An implementation of level set based topology optimization using GPU,2013, 10th World Congress on Structural and Multidisciplinary Optimization, pp. 1-10) (Year: 2013).*

PCT International Search Report and Written Opinion in International Appln. No. PCT/US2020/029318, dated Aug. 25, 2020, 20 pages.

Ullah et al., "A boundary element and level set based topology optimisation using sensitivity analysis", Engineering Analysis with Boundary Elements, Jun. 22, 2016, 70:80-98.

Youtube.com [online], Lars Christensen, "How to Setup & Run a Generative Design project—Fusion 360 Tutorial—LarsLive 175", published on Jun. 18, 2018, [retrieved on Aug. 7, 2020], retrieved from URL<https://www.youtube.com/watch?v=qZSZfikDxes>.

Allaire et al., "Casting constraints in structural optimization via a level-set method," 10th World Congress on Structural and Multi-disciplinary Optimization, May 19-24, 2013, Orlando, FL, US, 10 pages.

Cazacu and Grama, "Overview of structural topology optimization methods for plane and solid structures," Annals of the University of Oradea, Fascicle of Management and Technological Engineering, Issue No. 3, Dec. 2014, http://www.imtuoradea.ro/auo.fmte/, 6 pages.

Gain and Paulino, "A critical comparative assessment of differential equation-driven methods for structural topology optimization," Struc Multidisc Optim (2013) 48:685-710.

* cited by examiner

TOPOLOGY OPTIMIZATION OF STRUCTURE WITH MULTIPLE TARGETS

BACKGROUND

This specification relates to computer aided design of physical structures, which can be built using various manufacturing systems and techniques.

Computer Aided Design (CAD) software has been developed and used to generate three-dimensional (3D) representations of objects, and Computer Aided Manufacturing (CAM) software has been developed and used to manufacture the physical structures of those objects, e.g., using Computer Numerical Control (CNC) manufacturing techniques. Typically, CAD software stores the 3D representations of the geometry of the objects being modeled using a boundary representation (B-Rep) format. A B-Rep model is a set of connected surface elements specifying boundaries between a solid portion and a non-solid portion of the modelled 3D object. In a B-Rep model (often referred to as a B-Rep), geometry is stored in the computer using smooth and precise mathematical surfaces, in contrast to the discrete and approximate surfaces of a mesh model, which can be difficult to work with in a CAD program.

Further, CAD programs have been used in conjunction with subtractive manufacturing systems and techniques. Subtractive manufacturing refers to any manufacturing process where 3D objects are created from stock material (generally a "blank" or "workpiece" that is larger than the 3D object) by cutting away portions of the stock material. Such manufacturing processes typically involve the use of multiple CNC machine cutting tools in a series of operations, starting with a roughing operation, an optional semi-finishing operation, and a finishing operation. In addition to CNC machining, other subtractive manufacturing techniques include electrode discharge machining, chemical machining, waterjet machining, etc. In contrast, additive manufacturing, also known as solid free form fabrication or 3D printing, refers to any manufacturing process where 3D objects are built up from raw material (generally powders, liquids, suspensions, or molten solids) in a series of layers or cross-sections. Examples of additive manufacturing include Fused Filament Fabrication (FFF) and Selective Laser Sintering (SLS). Other manufacturing techniques for building 3D objects from raw materials include casting and forging (both hot and cold).

SUMMARY

This specification describes technologies relating to computer aided design of physical structures, which can be built using various manufacturing systems and techniques. In particular, a multi-target solve can be performed as part of a generative design process that optimizes a topology for of a structure to be manufactured.

One or more aspects of the subject matter described in this specification can be embodied in one or more methods, one or more non-transitory computer-readable mediums encoding a computer aided design program operable to cause one or more data processing apparatus to perform operations, and/or one or more systems including the one or more non-transitory computer-readable mediums and the one or more data processing apparatus configured to run the instructions of the computer aided design program to perform operations including: obtaining, by a computer aided design program, a design space for a modeled object, for which a corresponding physical structure will be manufactured, design criteria for the modeled object, at least one in-use load case for the modeled object, at least one specification of material from which the physical structure will be built, and two or more factors of safety; producing, by the computer aided design program, at least one generatively designed three dimensional topology of the modeled object in accordance with the design criteria, the at least one in-use load case, the at least one specification of material, the two or more factors of safety, and an initial design within the design space for the modeled object, wherein the producing includes starting from the initial design, generating a first design including a first computer aided design model of one or more first outer shapes of the at least one generatively designed three dimensional topology in accordance with a first target defined by a first of the two or more factors of safety, and starting from the first design or an intermediate design generated between the initial design and the first design, generating a second design including a second computer aided design model of one or more second outer shapes of the at least one generatively designed three dimensional topology in accordance with a second target defined by a second of the two or more factors of safety; and providing, by the computer aided design program, both the first design and the second design of the modeled object for assessment for use in manufacturing the physical structure.

The obtaining can include obtaining two or more specifications of different materials, and the producing can include generating at least four different designs in accordance with at least four different targets, wherein: the at least four different designs include the first design, the second design, a third design, and a fourth design, the at least four different targets include the first target, the second target, a third target, and a fourth target, the first design is generated from the initial design in accordance with the first target defined by the first of the two or more factors of safety and a first of the two or more specifications of different materials, the second design is generated from the first design, or the intermediate design, in accordance with the second target defined by the second of the two or more factors of safety and the first of the two or more specifications of different materials, the third design is generated from the second design, or a second intermediate design, in accordance with the third target defined by the first of the two or more factors of safety and a second of the two or more specifications of different materials, and the fourth design is generated from the third design, or a third intermediate design, in accordance with the fourth target defined by the second of the two or more factors of safety and the second of the two or more specifications of different materials; and wherein the method/operations include ordering the targets in the at least four different targets, which are used in the producing, in accordance with combinations of values of the two or more specifications of different materials and the two or more factors of safety.

The targets can be greater than four, and a number of the targets can be determined by a number of the different materials times a number of the factors of safety plus a target volume. Each design in the at least four different designs, other than the first design, can be generated from a corresponding intermediate design generated during the producing. In addition, the producing can include: checking, in each of multiple iterations of a generative design process effected by the producing, whether a current design is within a threshold distance of convergence to a final design of the at least four different designs for a current target of the at least four different targets; continuing iterative modification of the current design toward the final design for the current target in the generative design process when the current design is not within the threshold distance; spawning a separate process when the current design is within the threshold distance, wherein the generative design process effected by the producing continues in the separate process until convergence to the final design is achieved for the current target; and initiating the generative design process effected by the producing for a next target of the at least four different targets while more targets remain.

The generative design process can be a boundary based generative design process that employs a level-set representation of the current design. The method/operations can include producing the initial design from one or more predefined geometries identified for the modeled object, wherein the one or more predefined geometries are associated with the at least one in-use load case for the modeled object. The providing can include: presenting each of the at least four different designs on a display device; receiving selection of at least one of the at least four different designs; generating computer-numerical-control instructions for an additive manufacturing system or a subtractive manufacturing system in accordance with the selected design; and outputting the computer-numerical-control instructions for building the physical structure using the additive manufacturing system or the subtractive manufacturing system.

One or more aspects of the subject matter described in this specification can be embodied in one or more methods, one or more non-transitory computer-readable mediums encoding a computer aided design program operable to cause one or more data processing apparatus to perform operations, and/or one or more systems including the one or more non-transitory computer-readable mediums and the one or more data processing apparatus configured to run the instructions of the computer aided design program to perform operations including: obtaining, by a computer aided design program, a design space for a modeled object, for which a corresponding physical structure will be manufactured, design criteria for the modeled object, at least one in-use load case for the modeled object, at least one factor of safety, and two or more specifications of different materials from which the physical structure will be built; producing, by the computer aided design program, at least one generatively designed three dimensional topology of the modeled object in accordance with the design criteria, the at least one in-use load case, the at least one factor of safety, the two or more specifications of different materials, and an initial design within the design space for the modeled object, wherein the producing includes starting from the initial design, generating a first design including a first computer aided design model of one or more first outer shapes of the at least one generatively designed three dimensional topology in accordance with a first target defined by a first of the two or more specifications of different materials, and starting from the first design or an intermediate design generated between the initial design and the first design, generating a second design including a second computer aided design model of one or more second outer shapes of the at least one generatively designed three dimensional topology in accordance with a second target defined by a second of the two or more specifications of different materials; and providing, by the computer aided design program, both the first design and the second design of the modeled object for assessment for use in manufacturing the physical structure.

The obtaining can include obtaining two or more factors of safety, and the producing can include generating at least four different designs in accordance with at least four different targets, wherein: the at least four different designs include the first design, the second design, a third design, and a fourth design, the at least four different targets include the first target, the second target, a third target, and a fourth target, the first design is generated from the initial design in accordance with the first target defined by the first of the two or more specifications of different materials and a first of the two or more factors of safety, the second design is generated from the first design, or the intermediate design, in accordance with the second target defined by the second of the two or more specifications of different materials and the first of the two or more factors of safety, the third design is generated from the second design, or a second intermediate design, in accordance with the third target defined by the first of the two or more specifications of different materials and a second of the two or more factors of safety, and the fourth design is generated from the third design, or a third intermediate design, in accordance with the fourth target defined by the second of the two or more specifications of different materials and the second of the two or more factors of safety; and wherein the method includes ordering the targets in the at least four different targets, which are used in the producing, in accordance with combinations of values of the two or more specifications of different materials and the two or more factors of safety.

The targets can be greater than four, and a number of the targets can be determined by a number of the different materials times a number of the factors of safety plus a target volume. Each design in the at least four different designs, other than the first design, can be generated from a corresponding intermediate design generated during the producing. In addition, the producing can include: checking, in each of multiple iterations of a generative design process effected by the producing, whether a current design is within a threshold distance of convergence to a final design of the at least four different designs for a current target of the at least four different targets; continuing iterative modification of the current design toward the final design for the current target in the generative design process when the current design is not within the threshold distance; spawning a separate process when the current design is within the threshold distance, wherein the generative design process effected by the producing continues in the separate process until convergence to the final design is achieved for the current target; and initiating the generative design process effected by the producing for a next target of the at least four different targets while more targets remain.

The generative design process can be a boundary based generative design process that employs a level-set representation of the current design. The method/operations can include producing the initial design from one or more predefined geometries identified for the modeled object, wherein the one or more predefined geometries are associated with the at least one in-use load case for the modeled object. The providing can include: presenting each of the at least four different designs on a display device; receiving selection of at least one of the at least four different designs; generating computer-numerical-control instructions for an additive manufacturing system or a subtractive manufacturing system in accordance with the selected design; and outputting the computer-numerical-control instructions for building the physical structure using the additive manufacturing system or the subtractive manufacturing system.

One or more aspects of the subject matter described in this specification can be embodied in one or more methods, one or more non-transitory computer-readable mediums encoding a computer aided design program operable to cause one or more data processing apparatus to perform operations, and/or one or more systems including the one or more non-transitory computer-readable mediums and the one or more data processing apparatus configured to run the instructions of the computer aided design program to perform operations including: obtaining a design space for a modeled object, for which a corresponding physical structure will be manufactured, design criteria for the modeled object, at least one in-use load case for the modeled object, two or more specifications of different materials from which the physical structure will be built, and two or more factors of safety, ordering targets, including a first target, a second target and additional targets, defined in accordance with the two or more factors of safety and the two or more specifications of different materials, producing at least one generatively designed three dimensional topology of the modeled object in accordance with the design criteria, the at least one in-use load case, the two or more specifications of different materials, the two or more factors of safety, and an initial design within the design space for the modeled object, wherein the producing includes starting from the initial design, generating a first design including a first computer aided design model of one or more first outer shapes of the at least one generatively designed three dimensional topology in accordance with the first target, starting from the first design or an intermediate design generated between the initial design and the first design, generating a second design including a second computer aided design model of one or more second outer shapes of the at least one generatively designed three dimensional topology in accordance with the second target, and iteratively generating, starting from a last design or an intermediate design obtained before the last design, additional designs including additional computer aided design models of outer shapes of the at least one generatively designed three dimensional topology in accordance with the additional targets, and providing at least one of the generated designs of the modeled object for use in manufacturing the physical structure.

Each design in the at least four different designs, other than the first design, can be generated from a corresponding intermediate design generated during the producing. The producing can include: checking, in each of multiple iterations of a generative design process effected by the producing, whether a current design is within a threshold distance of convergence to a final design for a current target; continuing iterative modification of the current design toward the final design for the current target in the generative design process when the current design is not within the threshold distance; spawning a separate process when the current design is within the threshold distance, wherein the generative design process effected by the producing continues in the separate process until convergence to the final design is achieved for the current target; and initiating the generative design process effected by the producing for a next target while more targets remain.

The providing can include saving a selected design of the generated designs to a permanent storage device for use in manufacturing the physical structure, or generating computer-numerical-control instructions for an additive manufacturing system or a subtractive manufacturing system in accordance with the selected design. The system can include the additive manufacturing system or the subtractive manufacturing system, and the operations can further include manufacturing the physical structure with the additive manufacturing system or the subtractive manufacturing system using the computer-numerical-control instructions.

Particular embodiments of the subject matter described in this specification can be implemented to realize one or more of the following advantages. The user is given the ability to choose two or more different materials, two or more factors of safety, and/or other variables and values for performing a multi-target solve. The end point (or an intermediate point) in the topology optimization for one target is then used as the starting point for a next target, thus reducing the processing resources needed to find design solutions for different objectives in a generative design process. In some implementations, as the process gets close to a given target, the process can take a detour, e.g., by spawning a new process, to find the localized optima for the given target before working on a next target using the intermediate design that was close to the given target. This can further reduce the amount of processing resources needed to find optimal solutions for all the target objectives. Thus, computing resources use, computing time, and/or elapsed time can be reduced while achieving multiple targets.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
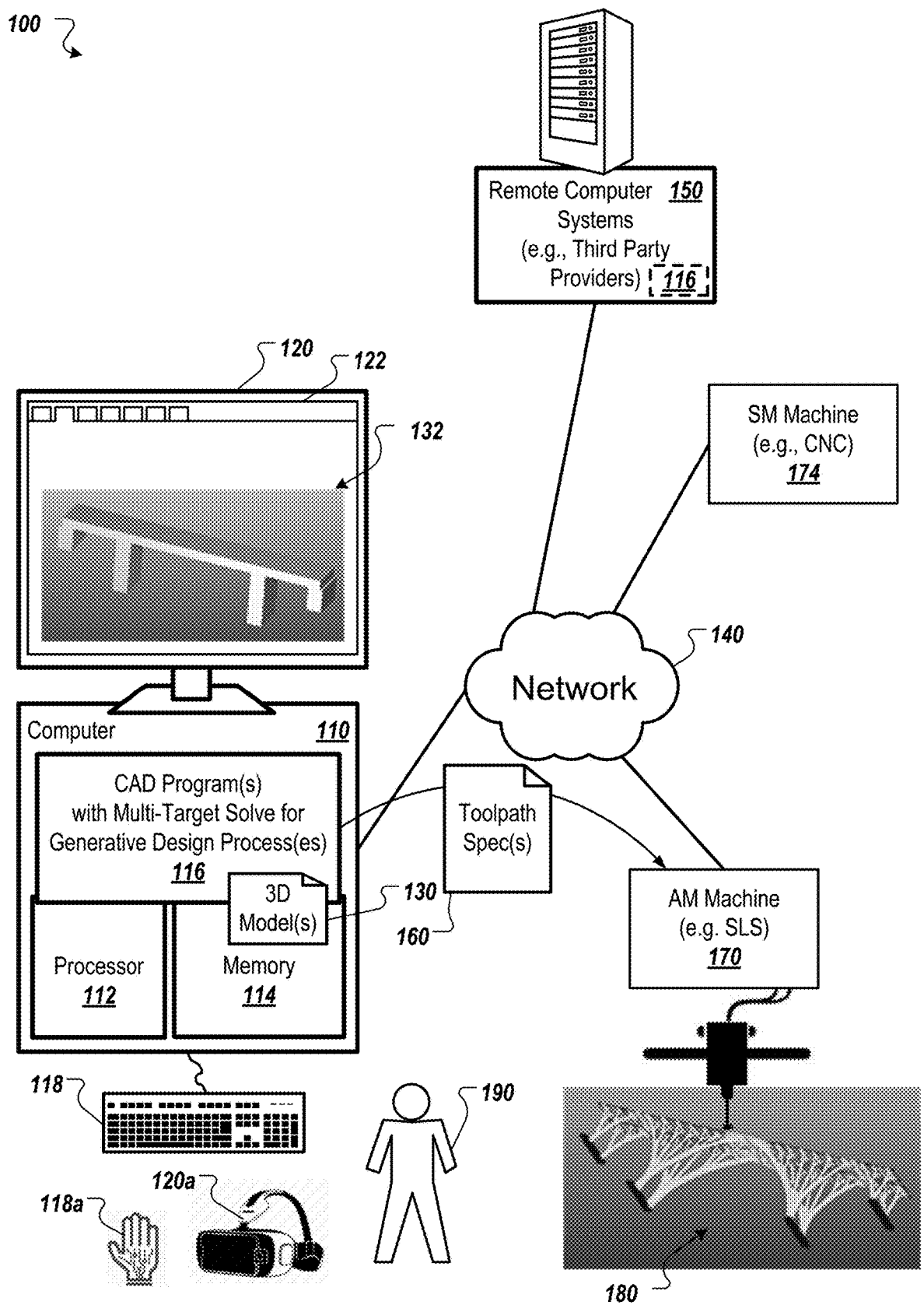
FIG. 1 shows an example of a system usable to produce and explore design options for objects to be built, e.g., using additive manufacturing, subtractive manufacturing and/or other manufacturing systems and techniques.

FIG. 1 shows an example of a system 100 usable to produce and explore design options for objects to be built, e.g., using additive manufacturing (AM), subtractive manufacturing (SM) and/or other manufacturing systems and techniques. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including Computer Aided Design (CAD) program(s) 116, which implement three-dimensional (3D) modeling functions and includes a multi-target solve option for one or more generative design processes that employ finite element analysis (FEA) and potentially other physical simulation methods. Further, in some implementations, the CAD program(s) 116 can implement manufacturing control functions.

As used herein, CAD refers to any suitable program used to design physical structures that meet specified design requirements, regardless of whether or not the program is capable of interfacing with and/or controlling specific manufacturing equipment. Thus, CAD program(s) 116 can include Computer Aided Engineering (CAE) program(s), Computer Aided Manufacturing (CAM) program(s), etc. The program(s) 116 can run locally on computer 110, remotely on a computer of one or more remote computer systems 150 (e.g., one or more third party providers' one or more server systems accessible by the computer 110 via the network 140) or both locally and remotely. Thus, a CAD program 116 can be two or more programs that operate cooperatively on two or more separate computer processors in that a program 116 operating locally at computer 110 can offload processing operations (e.g., generative design and/or physical simulation operations) "to the cloud" by having one or more programs 116 on one or more computers 150 perform the offloaded processing operations.

The CAD program(s) 116 present a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) or augmented reality (AR) system. For example, the input/output devices 118, 120 can include a VR/AR input glove 118*a* and/or a VR/AR headset 120*a*.

As noted above, the CAD program(s) 116 implement 3D modeling functions, which means a 3D model 132 can be built using the CAD program(s) 116. In some implementations, the CAD program(s) 116 implement physical simulation to assist in building the 3D model 132. Physical simulations, such as FEA, Computational Fluid Dynamics (CFD), Acoustics/Noise Control, thermal conduction, and/or computational injection molding simulations are often integral components in CAD-based product development. The CAD program(s) 116 can be used to build precise geometric descriptions of the design model, while physical simulations enable improved performance without time consuming physical testing.

The CAD program(s) 116 can provide user interface elements that enable the user to specify inputs for the physical simulation(s), such as materials and loading cases for the 3D model(s) 132, where the loading cases define loads in different directions to be borne by a part being designed. Thus, a user 190 can interact with the UI 122 of the CAD program(s) 116, including producing a full mechanical problem definition for an object to be built, so as to create and modify 3D model(s) 132, which can be stored in 3D model document(s) 130. Moreover, the CAD program(s) 116 implement at least one generative design method (locally and/or by remote procedure call) which enables the CAD program(s) 116 to generate one or more portions of the 3D model(s) 132 automatically (or the entirety of a 3D model) based on design criteria, where the geometric design is iteratively optimized based on simulation feedback. Note that, as used herein, "optimization" ("optimize", "optimum", etc.) does not mean that the best of all possible designs is achieved in all cases, but rather, that a best (or near to best) design is selected from a finite set of possible designs that can be generated within an allotted time, given the available processing resources.

The design criteria can be defined by the user 190, or by another party and imported into the CAD program(s) 116. The design criteria can include one or more design objectives and one or more design constraints. Design objectives can include those that minimize one or more cost functions and/or that maximize one or more utility functions for the object to be manufactured. In some implementations, design objectives include one or more of the following: (1) minimizing material usage (e.g., waste material), (2) minimizing weight, (3) minimizing manufacturing time, (4) maximizing tool life, (5) maximizing ability to remove support material, (6) targeting a set natural frequency (e.g., higher/lower natural modes of vibration to achieve vibration damping), and (7) positioning and packing of parts within the structure (e.g., electronic components for circuit actuation, including reserving space for cabling between components in an assembly, limiting cabling length, and/or components for structural health monitoring, as well as assembly considerations to ensure each component can be added/removed independently or with a limited number of steps). Design constraints can include those that address manufacturing requirements and/or that address use requirements. In some implementations, design constraints include one or more of the following: (1) manufacturing constraints that restrict geometries to those that can be manufactured (e.g., minimum self-supporting angle for AM processes in which separate support material will not be used, subject to build direction when appropriate, or mechanical access constraints for AM or SM processes, such as 3-axis, 5-axis and/or 2.5-axis CNC constraints), (2) thermo-mechanical constraints, (3) material fraction or variation constraints, (4) structural integrity, (5) stiffness, (6) compliance, (7) stress criteria (e.g., Von Mises or Tsai-Wu stress for manufacturing or use), (8) physical constraints (non-interference with larger system of parts), and (9) damage constraints (e.g., brittle elastic fraction resistance). In some implementations, the design criteria include minimizing compliance with volume, stress, displacement, buckling safety factor, and/or natural frequency constraints, but the method(s) can be generalized to other design objectives and constraints, including minimizing volume, deviation (e.g., least square deviation) from a target (compliant mechanism), and/or design dependent loads (pressure loads).

Various generative design processes can be used as the at least one generative design method implemented by the CAD program(s) 116. These generative design processes can optimize the shape and topology of at least a portion of the 3D model. The iterative optimization of the geometric design of the 3D model(s) by the CAD program(s) 116 involves topology optimization, which is a method of lightweighting where the optimum distribution of material is determined by minimizing an objective function subject to constraints (e.g., structural compliance with volume as a constraint). Topology optimization can be addressed using a variety of numerical methods, which can be broadly classified into two groups: (1) material or microstructure techniques, and (2) geometrical or macrostructure techniques. Microstructure techniques are based on determining the optimum distribution of material density and include the SIMP (Solid Isotropic Microstructure with Penalization) method and the homogenization method. In the SIMP method, intermediate material densities are penalized to favor either having $\rho=0$ or $\rho=1$, denoting a void or a solid, respectively. Intermediate material densities are treated as composites in the homogenization method.

In contrast, macrostructure techniques treat the material as being homogeneous, and the three dimensional topology of the modeled object being produced is represented as one or more boundaries between one or more solid regions (having the homogenous material therein) and one or more void regions (having no material therein) within the design space (also referred to as the domain or a sub-space of the domain for topology optimization). The shape(s) of the one or more boundaries is optimized during the generative design process, while the topology is changed in the domain as a result of the shape optimization in combination with adding/removing and shrinking/growing/merging the void region(s). Thus, the types of final optimized topologies that can result from a generative design process using a macrostructure technique can depend significantly on the number and sizes of voids within the seed geometry for the process.

In the example of FIG. 1, the 3D model 132 shown is an initial design for the object (in this case, an arc bridge) composed of a top block with four pillars underneath. This initial design is then modified using a generative design process to produce a detailed three dimensional topology (composed of different shapes) of the modeled object, which can then be used to build a physical structure 180 of the generated model. As will be appreciated, many different types of objects can be produced using the CAD program(s) 116, many different initial designs can be used (as described in further detail below), additional geometry can be produced for the 3D model(s) 132 (of various types, including B-Rep, T Spline, subdivision surface, mesh, and/or other computer modelling formats) using the UI 122, and such additional geometry can be used to set up the input(s) to the generative design process.

The generative design process can have many different inputs and can explore many different design options based on those inputs. Initially, information about the design space (e.g., space constraints), the service conditions (e.g., loads and support constraints), materials (e.g., aluminum, steel, titanium, etc.), factors of safety, manufacturing constraints, and the goals (e.g., objectives such as minimizing mass and/or maximizing stiffness, or volume reductions) are collected. The variations of such input design information produces variations in output designs, where the design variations can easily exceed hundreds of design options. The generative design process produces design options using topology optimizations.

Applying topology optimization to structural design typically involves considering objectives like minimizing mass or volume, safety factor constraints, homogenizing stress distribution, ensuring proper manufacturability, minimizing production costs, etc., and some of the objectives can be contradictory. Thus, achieving multiple objectives using generative design processes is often very time consuming and processing resource intensive. However, by recognizing that materials and factors of safety are essentially a sizing problem, they can be treated as detours on route to a final destination, which can significantly reduce the amount of processing resources needed for (and thus speed up the) generative design process to explore many design options.

For example, rather than running an individual solve for each variant of three materials and/or factors of safety that a user of the CAD program(s) 116 would like to evaluate, the solver can rearrange the materials and desired factors of safety in descending order, and treat them as milestones along a longer route of topology optimization. All desired variants can be solved in a single pass, taking localized detours (as needed) as each milestone is reached. Each detour can be done in-process or be spawned as a separate process, and allows the solver to converge on the localized optima for a specific factor of safety and/or material. Thus, all objectives can be realized in one pass, saving time and computational cost. Detailed examples of such processes are described below in connection with FIGS. 2-6.

In addition, in some implementations, the CAD program(s) 116 implement manufacturing control functions. Once the user 190 is satisfied with a 3D model, the 3D model can be stored as the 3D model document(s) 130 and/or used to generate another representation of the model (e.g., an .STL file for additive manufacturing). This can be done upon request by the user 190, or in light of the user's request for another action, such as sending the 3D model to an AM machine 170, or other manufacturing machinery, which can be directly connected to the computer 110, or connected via a network 140, as shown. This can involve a post-process carried out on the local computer 110 or a cloud service to export the 3D model to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the CAD program(s) 116 can provide a document 160 (having toolpath specifications of an appropriate format) to the AM machine 170 to produce the physical structure 180. The AM machine 170 can employ one or more additive manufacturing techniques, such as granular techniques (e.g., Powder Bed Fusion (PBF), Selective Laser Sintering (SLS) and Direct Metal Laser Sintering (DMLS)), extrusion techniques (e.g., Fused Deposition Modelling (FDM), which can include metals deposition AM). In some cases, the AM machine 170 builds the physical structure 180 directly, and in some cases, the AM machine 170 builds a mold for use in casting or forging the physical structure 180. In addition, the user 190 can save or transmit the 3D model for later use. For example, the CAD program(s) 116 can store the document(s) 130 that includes the 3D model.

In some implementations, the CAD program(s) 116 implement manufacturing control functions for SM machine(s) 174 (e.g., a Computer Numerical Control (CNC) milling machine, such as a multi-axis, multi-tool milling machine) to be used in the manufacturing process. For example, the CAD program(s) 116 can generate CNC instructions for a machine tool system 174 that includes multiple tools (e.g., solid carbide round tools of different sizes and shapes, and insert tools of different sizes that receive metal inserts to create different cutting surfaces) useable for various machining operations. Thus, in some implementations, the CAD program(s) 116 provide a document 160 (having toolpath specifications of an appropriate format, e.g., a CNC numerical control (NC) program) to the SM machine 174 for use in manufacturing the physical structure 180 using various cutting tools and roughing, semi-finishing and/or finishing operations.

In general, various different manufacturing systems and techniques can be employed, either alone or in combination, to produce a final structure, and the CAD program(s) 116 can include suitable algorithms to generate toolpath specifications 160 (or other instructions) for one or more of these various systems to manufacture an object that has been designed using the systems and techniques described in this application. In addition, it will be appreciated that the system and techniques can be used in larger building/construction projects. For example, the example physical structure 180 is a bridge, and rather than the physical structure 180 being a scale model of a larger bridge, the physical structure 180 can be the actual bridge itself. As will be appreciated, many different types of physical structures, including buildings or portions of buildings, bridges or portions of bridges, automotive or airplane parts, etc., can be designed (and built) using the systems and techniques described herein.

Figure 2:
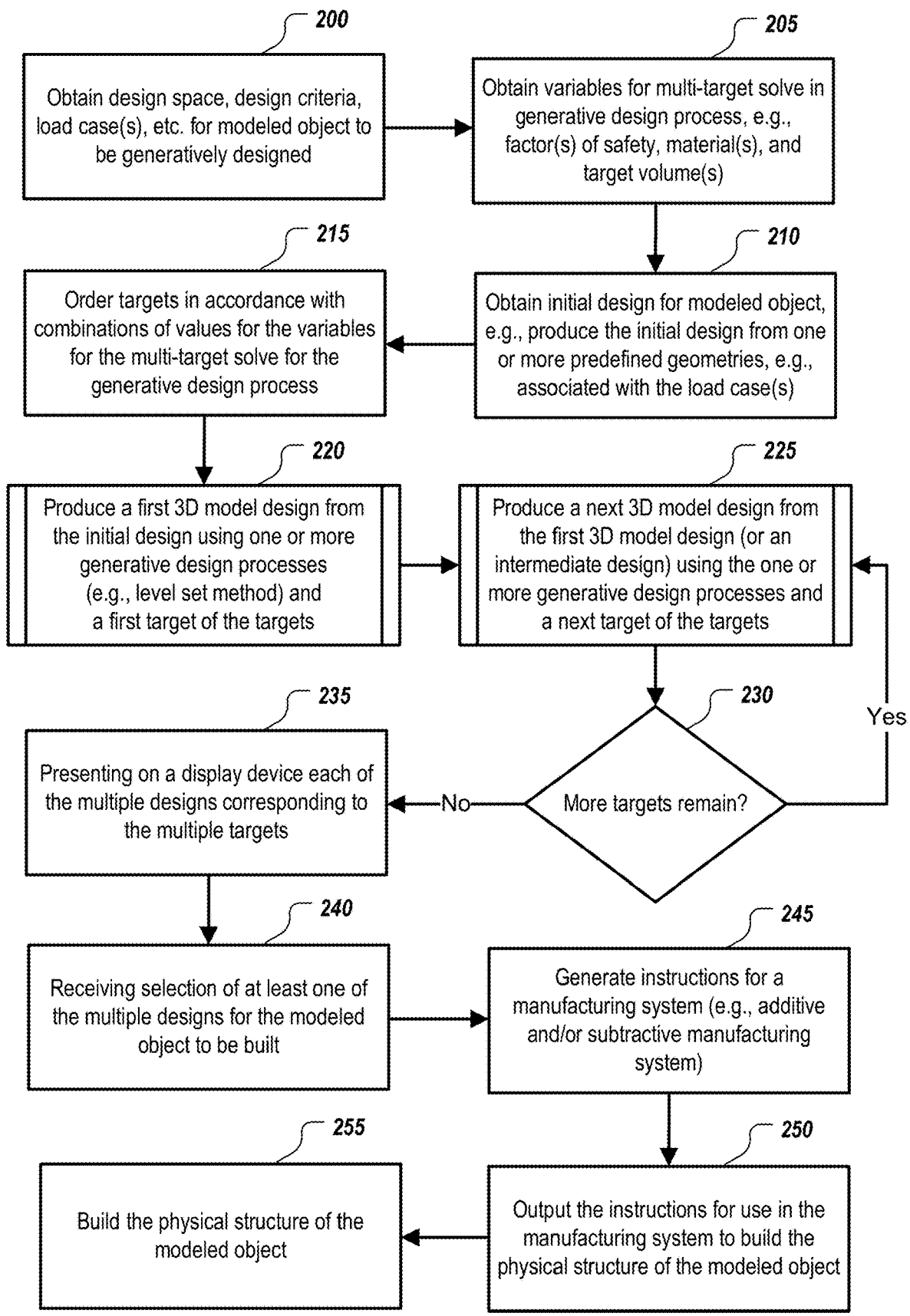
FIG. 2 show an example of a process for optimizing the topology of a structure using multiple targets.

FIG. 2 show an example of a process for optimizing the topology of a structure using multiple targets. Design inputs are obtained 200, e.g., by CAD program(s) 116. This can involve receiving the design inputs through a UI, e.g., UI 122, or from another process or party. The design inputs can include a design space for a modeled object, design criteria for the modeled object, and at least one in-use load case for the modeled object. The design space is a representation of the physical space to which the design structure (shape) will be limited, i.e., the space constraints for the generative design process. The design space can be an explicitly modelled space (e.g., as specified by user 190 using UI 122) or a combination of modelled spaces, modelled excluding (obstruct) spaces and preserved spaces (e.g., regions for specifying loads and constraints).

The design criterial for the modeled object can include both design objectives and design constraints, as detailed above. The design criteria can include design objectives (goals) such as minimizing mass; maximizing stiffness; or volume reductions. In addition, the design criteria can include manufacturing constraints. Note that there can be several limiting factors to be considered in driving design veracities. Different manufacture methods will have different sets of limitations that affect the design. For example, CNC machining has limitations on tool access space, 3D printing has limits on surface overhang angles and wall thickness, and casting has a molding constraint in that the shape of the cast part should allow removal of the molds.

The at least one in-use load case for the modeled object indicates expected services conditions. This can include specification of how the structure (object) reacts to the surrounding structures (objects) during in-use service. This can include multiple load cases and support (fixing and connection to surrounding structures) constraints. In some cases, these can be defined by the user 190, e.g., through UI 122, in relation to 3D model geometry produced to serve as connection points (e.g., preserve objects) for the generative design process.

In addition, variables for a multi-target solve in a generative design process are obtained 205, e.g., by CAD program(s) 116. This can involve receiving through a UI, e.g., UI 122, or from another process or party, a specification of which target variables to use and what values to use for them. For example, the target variables can include material, factor of safety, or both. Note that such references to "material" in this document indicate a computer model/specification of the properties of the material to be used to build the physical structure corresponding to the modeled object. At least one material is selected 205 for the construction of the structure (object), but to drive better designs, two or more materials can be considered for the generative design process. In addition, a factor of safety is a constraint to limit the maximum stress in the design object during its service. Finally, while shown in FIG. 2 as separate operations, it will be appreciated that obtaining 205 (e.g., receiving) the variables and obtaining 200 (e.g., receiving) the design information can be done at the same time, e.g., through a common UI.

An initial design is obtained 210 for the modeled object. This can involve producing the initial design from one or more predefined geometries identified for the modeled object, where the one or more predefined geometries are associated with the at least one in-use load case for the modeled object, e.g., preserve objects having user defined load cases, as described above. For example, the initial design can be a convex hull that contains all preserve objects. Other initial designs can also be used. For example, the initial design can be an existing 3D model created by the user, such as the top block with four pillars model 132 shown in FIG. 1.

Figure 3:
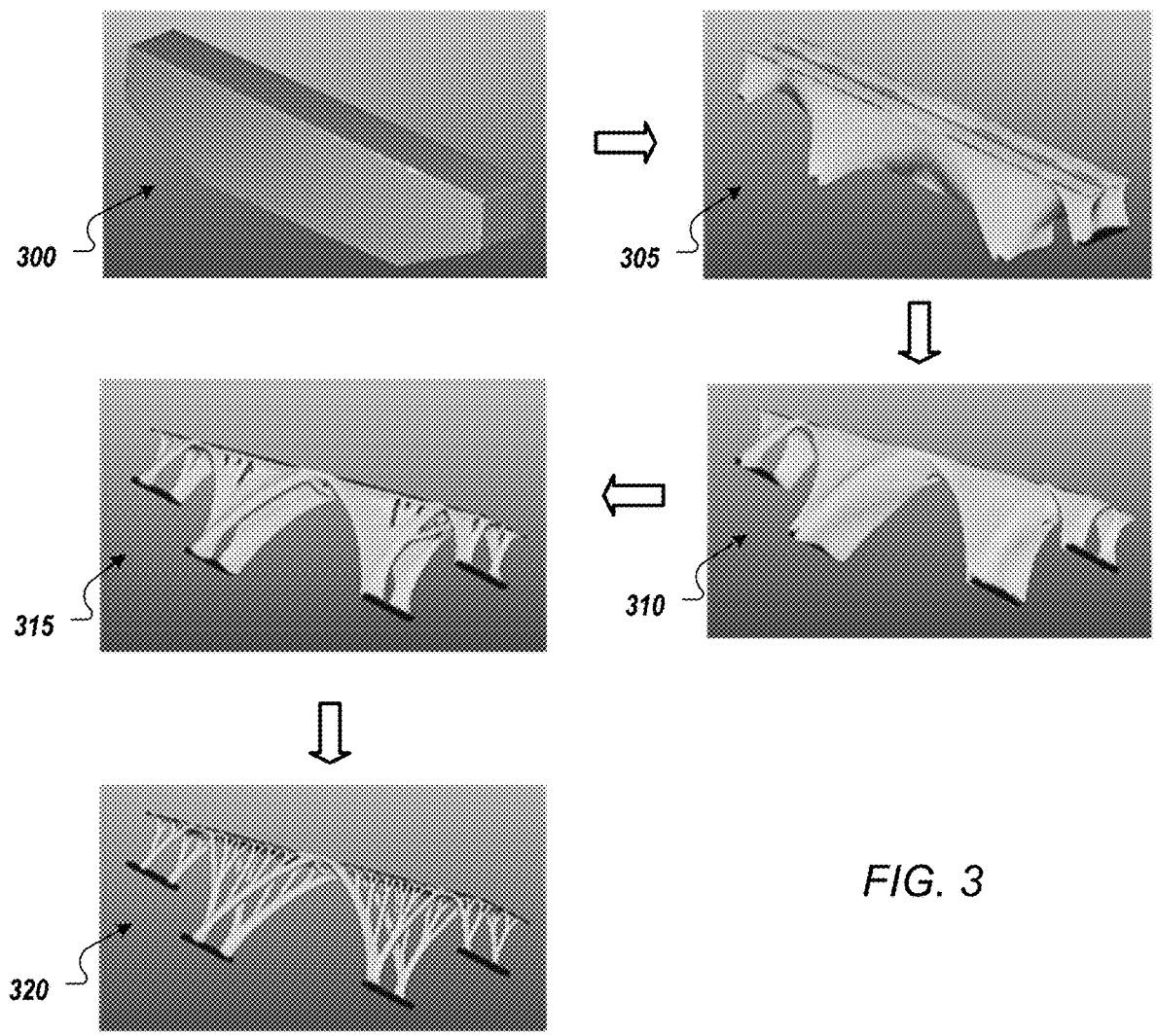
FIG. 3 shows an example of an arc bridge evolved from a block using the described generative design process(es).

In some cases, the initial design is a simple blob or seed model, e.g., a solid 3D shape having many holes therein, subject to any limitations imposed on the initial model by the generative design process to be used. For example, FIG. 3 shows an example of an arc bridge evolved from a block using the described generative design process(es). In this example, the initial model 300 is a simple block. As the generative design process proceeds, it creates a first intermediate 3D model 305 with initial shape changes, then a second intermediate 3D model 310 with shape and topology changes, then a third intermediate model 315 with additional shape and topology changes, before finally reaching a converged 3D model 320 with final proposed shapes and topology for the arc bridge. As will be appreciated, as some generative design processes are not highly dependent on the initial model, various combinations of objects within the design space can be used as the initial model. In some cases, the starting shape is essentially irrelevant, as the solver can both grow and shrink the design.

Returning to FIG. 2, the targets are ordered 215 in accordance with combinations of the values obtained 205 for the variables for the multi-target solve for the generative design process, e.g., by CAD program(s) 116. As noted above, the user can choose one or more materials, as well as one or more factors of safety, for the generative design process. However, rather than solving for each combination of material and safety factor separately, a multi-objective solve (two or more targets, three or more targets, four or more targets, etc.) can be performed, where an optimized topology can be produced for each combination of material and safety factor in one pass (with possible side branches, as explained further below).

To order 215 the targets, the selected materials are ranked 215 by strength, and then the process of shape/volume reduction goes from the biggest shape (weakest material) to the smallest shape (strongest material). In other words, in a topology optimization process that starts from a larger shape and does a shape reduction to find the optimal shape, shapes that are optimal for weaker materials will be arrived at first, a local optima can then be found for that first target, and then the process can move on to the next, stronger material, which will support further shape reduction. In the example of the arc bridge, the skeletal shape (topology) of the geometry often remains the same, given the defined loads, and it is the thickness of the struts that are dictated by the material selected. Note that these are two or more objectives of the same type (material type) being used in a generative design solve.

Similarly, the selected factors of safety (e.g., calculated based on material-yielding stress/max stress in the solid) can be ranked 215 by their values. For example, if the user selects a first factor of safety of 2.0 and a second factor of safety of 1.5, and then the process of shape/volume reduction goes from the biggest shape (largest factor of safety, e.g., 2.0) to the smallest shape (smallest factor of safety, e.g., 1.5). In other words, in a topology optimization process that starts from a larger shape and does a shape reduction to find the optimal shape, shapes that are optimal for higher factors of safety will be arrived at first, a local optima can then be found for that first target, and then the process can move on to the next, lower factor of safety, which will support further shape reduction. In the example of the arc bridge, the skeletal shape (topology) of the geometry often remains the same, given the defined loads, and it is the thickness of the struts that are dictated by the factor of safety selected. Note that these are two or more objectives of the same type (factor of safety) being used in a generative design solve.

In the examples above, the ordering of targets assumes one material and two or more factors of safety, or one factor of safety and two or more materials. But two or more factors of safety can also be selected at the same time as two or more materials, and the combinations of these also produce targets that are ordered 215. For example, the materials brass and steel can be selected, along with the factors of safety of 2.0 and 1.5, i.e., four total targets. In many cases, the targets are ordered 215 by material strength first, and then by factors of safety. Thus, in this example, the ordered targets would be: (1) brass at 2.0; (2) brass at 1.5; (3) steel at 2.0; and (4) steel at 1.5. However, as will be appreciated, depending on how different the strengths of the selected materials are, and how different the selected factors of safety are, the ordering of the targets can switch material type before going through all the selected factors of safety, such as described further below in connection with equation 11.

In addition, note that the description above assumes the shape optimization starts from a larger shape that is then reduced. In some implementations, the shape optimization can start from a smaller shape (or even an empty volume) and increase the shape's volume while optimizing the topology, and in such cases, the ordering 215 of the targets will be in the opposite direction. In addition, the shape optimization of the generative design process can both reduce and increase the shape in the course of solving for the specified objectives.

For example, the solver for the generative design process can use a level-set method and a solution grid (a voxel resolution where each voxel can be partially filled) that allows material to be added or removed as the topology is iteratively optimized. If a specific region of the current design is too weak, based on the stress distribution, additional material can be added there and grown in subsequent iterations. In some implementations, the mass change ratio is limited on each iteration to be relatively small, e.g., less than or equal to 2% of the current mass, and the solver is a linear stress solver, which means the stress distributions are mainly affected by the loadings and constraints.

Further details are provided below for a level-set implementation in connection with equations 6-10, but note that this approach of adding and removing material, as the topology is iteratively optimized, is not limited to using level-set methods and can be applied to other generative design methods. For example, for SIMP, ESO (Evolutionary Structural Optimization) or SKI (Soft-Kill Option) methods, a similar process can be implemented based on a sensitivity analysis, like equation 8 for the level-set method, where such methods essentially try to keep/increase material in high sensitivity regions and reduce materials on low sensitivity regions. In addition, because of this ability to both grow and shrink the topology shapes, the ordering of the targets need not be perfect, and even if the ordering is wrong, the generative design process will still produce the multiple designs more quickly than a traditional approach; when the ordering is correct, the local detours will be relatively small/quick, and when the ordering is not perfect, the local detours will take a bit longer because the starting point for the next design won't be as close as would otherwise be possible for that material and that safety factor.

A first 3D model design is produced 220, e.g., by CAD program(s) 116, from the initial design using one or more generative design processes and a first target of the ordered targets. Various types of generative design processes can be used to produce a generatively designed three dimensional topology of the modeled object, as explained above, in accordance with the design inputs and the values for the selected multi-target variables. For example, the generative design process used can be a boundary based generative design process that employs a level-set representation of the current design. Other geometrical or macrostructure techniques, as well as material or microstructure techniques, can also be used for topology optimization.

Figure 4:
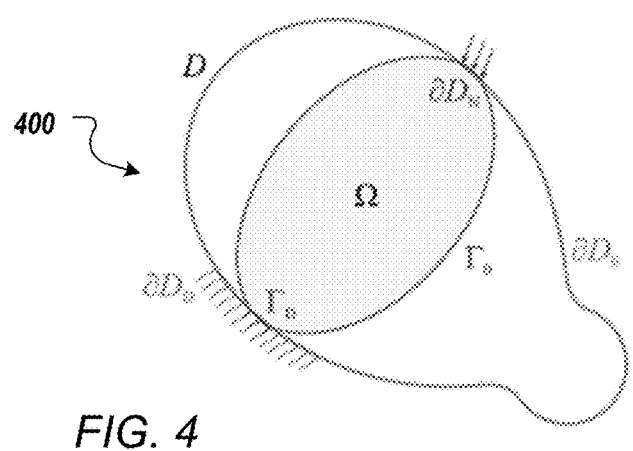
FIG. 4 shows a generalize representation of a working domain for topology optimization in a generative design process.

Topology optimization refers to the optimum distribution of a material in a given design space $D \subset R^d$ (d=2 or 3), under certain specified boundary conditions and constraints. FIG. 4 shows a generalize representation of a working domain 400 for topology optimization in a generative design process. The focus in the description here is on compliance minimization problems for linearized elastic systems. The goal is to optimize a shape (or structure) $\Omega \subset D$, so the compliance is minimum. Compliance is the work done by applied load, which is given by:

$$J(\phi) = \int_D f \cdot u \, dx + \int_{\partial D_N} g \cdot u \, ds = \int_D C(\phi) \varepsilon(u) \cdot \varepsilon(u) dx \quad (1)$$

where f is the body force, g represents the surface loads, $C(\phi)$ is the effective elasticity tensor which depends on the design function $\phi$, dot denotes the inner product, and u represents the displacement field, which is obtained by solving the state equations below:

$$-\nabla \cdot (C(\phi)\varepsilon(u)) = f \text{ in } D$$

$$u = 0 \text{ on } \partial D_D$$

$$(C(\phi)\varepsilon(u)) \cdot n = g \text{ on } \partial D_N$$

$$(C(\phi)\varepsilon(u)) \cdot n = 0 \text{ on } \partial D_0 \quad (2)$$

where $\varepsilon$ is the linearized strain, $\varepsilon(u) = \frac{1}{2}(\nabla u + \nabla u^T)$, $\partial D$ is the domain boundary consists of three disjoint components, $\partial D = \partial D_D \cup \partial D_N \cup \partial D_0$. Here $\partial D_D$, $\partial D_N$, and $\partial D_0$ correspond to Dirichletian boundary conditions, Neumann boundary conditions, and free boundary conditions (g=0), respectively; see FIG. 4).

The compliance minimization problem entails finding the stiffest configuration under the applied loads and boundary conditions. For industry applications, a volume constraint is imposed:

$$V(\phi) = \int_D \rho(\phi) dx - V_{max} \quad (3)$$

And/or factor of safety ($f_s$) constraint:

$$S(\phi) = \int_D k(\sigma) \rho(\phi) dx \quad (4)$$

On the problem (1) using the Lagrange multiplier method to obtain the following unconstrained optimization problem:

$$\inf_\phi J(\phi) = J(\phi) + \lambda_V V(\phi) + \lambda_S S(\phi) \quad (5)$$

where ρ(φ) is density function, $V_{max}$ is prescribed volume fraction, $\sigma_s$ is the tensile strength of the material, and $$k(\sigma) = \begin{cases} \dfrac{\sigma_s}{\sigma} - f_s & \sigma \geq \sigma_s/f_s \\ 0 & \sigma < \sigma_s/f_s \end{cases}$$

is the stress factor, and $\lambda_V$ and $\lambda_S$ are positive Lagrange multipliers.

In the case of level-set methods, a signed distance function is used as the design function φ, which is defined as:

$$\begin{cases} \phi = 0 & x \in \partial\Omega \cap D, \\ \phi = -\text{distance to } \partial\Omega & x \in \Omega, \\ \phi = \text{distance to } \partial\Omega & x \in (D\backslash\Omega \cup \partial\Omega) \end{cases} \quad (6)$$

and the topology is evolved over fictitious time using the Hamilton-Jacobi equation:

$$\frac{\partial \phi}{\partial t} + v|\nabla \phi| = 0, \quad \frac{\partial \phi}{\partial n} = 0 \text{ on } \partial D \quad (7)$$

where n is the normal vector and the advection velocity v is obtained from the shape sensitivity analysis.

For objective (5), v is given as:

$$v = \varepsilon(u)^T C \varepsilon(u) - \mu \quad (8)$$

The solution of system (7) is an iteration process. μ is a parameter that controls the volume change. To achieve a balanced convergence speed and results quality, the volume change rate α for each iteration should be controlled in a small number range (-β to β) Considering the constraints (3) and (4), μ can be evaluated by:

$$\mu = \left(\int_{\partial\Omega} \varepsilon(u)^T C \varepsilon(u) ds - \alpha \int_D \rho(\phi) dx\right) \bigg/ \int_{\partial\Omega} ds \quad (9)$$

$$\alpha = \begin{cases} \beta & V(\phi) + pS(\phi) > \beta V_\Omega \\ \dfrac{V(\phi) + pS(\phi)}{V_\Omega} & -\beta V_\Omega \leq V(\phi) + pS(\phi) \leq \beta V_\Omega, \\ -\beta & V(\phi) + pS(\phi) < -\beta V_\Omega \end{cases} \quad (10)$$

$V_\Omega = \int_D \rho(\phi) dx$ is volume of current shape, β is a small number in the range of (0.01 to 0.05), p is a large number to enforce the over stress region in the next shape to be very small.

Thus, referring again to FIG. 2, beginning with the initial design, $\Omega_0$, (e.g., a convex hull of interface geometry attachment points and/or of preserved geometries for applying loads and constraints, or simply a block of material or an initial/existing design provided by a user) the design inputs (e.g., the defined design space, the specified service conditions, and design requirements and/or design goals) can be processed 220 by solving equation 2 above, e.g., using FEA, then calculating the signed distance field (equation 6 in D), performing sensitivity analysis for v (equations 8, 9 and 10), updating the signed distance field (equation 7), updating the new shape, $\Omega_i$, using the level-set method, and then checking for convergence. This process repeats 220 until convergence is reached, and a new output shape, $\Omega_i$, is provided as the optimal solution for the first target.

This optimized first design, $\Omega_i$, is a computer aided design model of one or more first outer shapes of at least one generatively designed three dimensional topology. This first design, $\Omega_i$, or an intermediate design, $\Omega_{i-x}$, generated before convergence was reached, is then used as the next starting point for a next 3D model design to be produced 225, e.g., by CAD program(s) 116, using the one or more generative design processes and a next target of the ordered targets. The process 225 can be the same process as that of process 220, and thus the same topology optimization methods as described above can be used. In some implementations, the same procedure call is used recursively, and so the parameters of the multi-target variables (e.g., material and factor of safety) can simply be changed during the iterative process, while keeping all remaining design inputs constant.

Given an initial geometry, the algorithm takes an evolutionary approach to find the best structure to satisfy the objectives of a target. When multiple targets are required, the approach is to allow the evolution to take localized detours to solve a target on route to the destination. Referring to the topology optimization process described above, if β is controlled to be small enough (in the range of 0.01 to 0.05), some important observations are as follows:

(1) The final optimal shape is determined by the primary design parameters. The initial shape (not too small in related to the design space) only has limited influence on the final shape—a good topology optimization process will lead the topology evolution of shape to the optimal (maximal strength/stiffness) under the loads and constraints. But the initial shape does have considerable influence on the number of iterations needed to find the optimal topology and shape.

(2) For structures under stress loads the topology evolution follows the route of removing materials from low stress regions, and at the same time adding material to the high stress regions. The optimal shape is the shape with the lightest structure with maximum stiffness (minimal max stress) under the given loads and constraints. So, for the multiple design targets, a reliable topology evolution normally starts with a large volume initial shape. It will reach the target with loads and constraints requiring the lowest maximum stress first then gradually evolve to the ones requiring higher maximum stress. Based on the constitutive laws of engineering materials, this means the topology evolution will reach the target with biggest volume first and gradually evolve to the lighter structures.

(3) For volume reduction targets (starting with an existing design), the topology will evolve from lower volume reduction target to higher volume reduction targets.

Based on those observations we can order the optimal targets $T_{\beta_j}(f_s, V_{max}, M)$ that satisfy $V_{\Omega_j} > V_{\Omega_{j+1}}$, where $f_s$ are the variants of factor of safety, $V_{max}$ are the variants of volume reductions, and M are the material variants. $V_{\Omega_j}$ is the volume of the optimal design of j-th optimal target. Based on observation 2 above we have $$V_{\Omega_i}(S_{M_i}/f_{s_i}) > (S_{M_j}/f_{s_j}) \text{ if } S_{M_i}/f_{s_i} < S_{M_j}/f_{s_j}, \quad (11)$$

where $S_M$ is material strength. Thus, for example, if there are two selected materials, being A36 steel of $S_M$=250 MPa and brass of $S_M$=135 MPa, along with three selected factors of safety being 3.0, 2.0 and 1.5, then there are six targets in total that are ordered as follows:

1. brass with factor of safety of 3.0.

$$S_{M_j}/f_{s_j} = \frac{135}{3} = 45;$$

2. brass with factor of safety of 2.0.

$$S_{M_j}/f_{s_j} = \frac{135}{3} = 67.5;$$

3. A36 steel with factor of safety of 3.0.

$$S_{M_j}/f_{s_j} = \frac{250}{3} = 83.33;$$

4. brass with factor of safety of 1.5.

$$S_{M_j}/f_{s_j} = \frac{135}{1.5} = 90;$$

5. A36 steel with factor of safety of 2.0.

$$S_{M_j}/f_{s_j} = \frac{250}{2} = 125; \text{ and}$$

6. A36 steel with factor of safety of 1.5.

$$S_{M_j}/f_{s_j} = \frac{250}{1.5} = 166.667.$$

Figure 5:
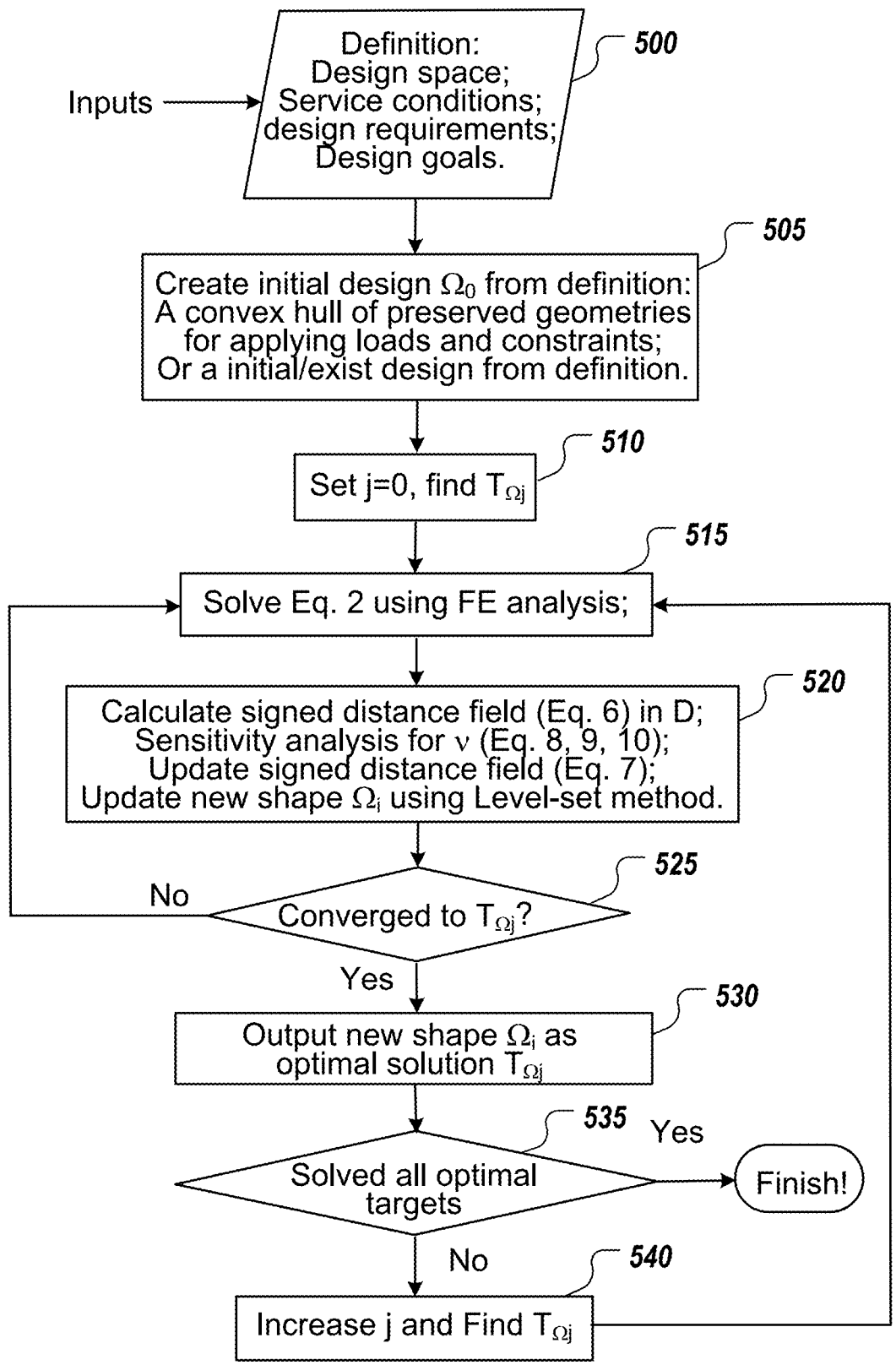
FIG. 5 shows an example of a generative design process with a multiple targets search.

FIG. 5 shows an example of a generative design process with a multiple targets search. Inputs are received 500, including the defined design space, the specified service conditions, and design requirements and/or design goals. An initial design, $\Omega_0$, is created 505, e.g., from a convex hull of preserved geometries for applying loads and constraints, or an initial/existing design provided by a user or other party. A target iteration variable, j, is set to zero and an initial target, $T_{\Omega j}$, is found 510. Equation 2 is solved 515 using FEA. The signed distance field is calculated (equation 6 in D), sensitivity analysis is performed for v (equations 8, 9 and 10), the signed distance field is updated (equation 7), and the new shape, $\Omega_i$, is updated using the level-set method 520. A check for convergence to $T_{\Omega j}$ is then performed 525. This process repeats 515, e.g., with a new recursive procedure call, until convergence is reached, and a new output shape, $\Omega_i$, is provided 530 as the optimal solution for $T_{\Omega j}$. Then, a check is made 535 to see if all optimal targets have been solved. If not, j is increased by one, and a next target, $T_{\Omega j}$, is found 540, before the process repeats 515, e.g., with a new recursive procedure call.

Returning to FIG. 2, the ending point (or near ending point) of the last optimization iteration is used as the starting point for the next optimization iteration, in accordance with the ordered targets, e.g., further material reduction in a next iteration using the next strongest material and/or the next lower factor of safety. Thus, a check is made 230 to see if any targets remain, the process continues with a next iteration 225 as long as an additional target remains. Note that the number of targets, and thus the number of generated designs, will depend on the number of selected multi-target variables and values specified therefor.

For example, if there are two materials and two factors of safety values, there will be four targets and four designs produced. Many other numbers of targets are possible. The design inputs can include one to many loads, one to many constraints, one to many manufacturing methods, etc. Likewise, the design variables can include one to many materials, one to many factors of safety, and one to many target volume reductions. For each iteration, of the generative design process, the design inputs (e.g., loads, constraints, and manufacturing methods) are held constant, while the design variables (e.g., material, factor of safety, and target volume) are changed from one iteration to the next.

The number of targets can be defined in accordance with (Factors-of-Safety×Materials+Volume). Thus, in the case of three factors of safety (e.g., 3, 2, and 1), three materials (e.g., aluminum, steel, and titanium), and three volume target reductions (e.g., 75%, 85%, and 95%) there will be twelve targets, and each target can produce a final shape as well as intermediate shapes. Note that the volume target is not sensitive to materials as long as Poisson's ratio of the materials are close enough. Many engineering materials (for structural purpose) have similar Poisson's ratio.

However, if the difference of Poisson's ratios for the materials are significant, then a new process can be spawned at the converge point of one material for each other material with a significant difference in Poisson's ratio. In this case, the total targets can become 3 (factor of safety)×3 (material)+3 (volume)×3 (material)=18. Moreover, additional parameters can be moved from the fixed design parameters to the design parameters that are changed in the iterative topology optimization process, such as manufacturing constraints. In this case, the one or more additional parameter targets (e.g., manufacturing constraints) are a multiply factor to the number of targets. For example, the total number of targets can become N-constraints×(N-factor_of_safety×N-materials+N-Volumes) for materials with similar Poisson's ratio, or N-constraints×(N-factor_of_safety×N-materials+N-Volumes×M-materials) for the cases of M different Poisson's ratios.

In addition, as noted above, in each target iteration, rather than using the ending point of the last optimization iteration as the starting point for the next optimization iteration, a near ending point of the last optimization iteration can be used as the starting point. For example, a check can be made to determine whether a current design is within a threshold distance of convergence to a final design for the current target, and if so, a separate process can be spawned to use the current design as its starting point for the next target, even though convergence has not been reached in the design for the current target. For example, in a cloud computing implementation, a new process can be spawned to run in the cloud computer(s) to finish each target once the new shape $\Omega_i$ nears the target $T_{\Omega j}$.

Figure 6:
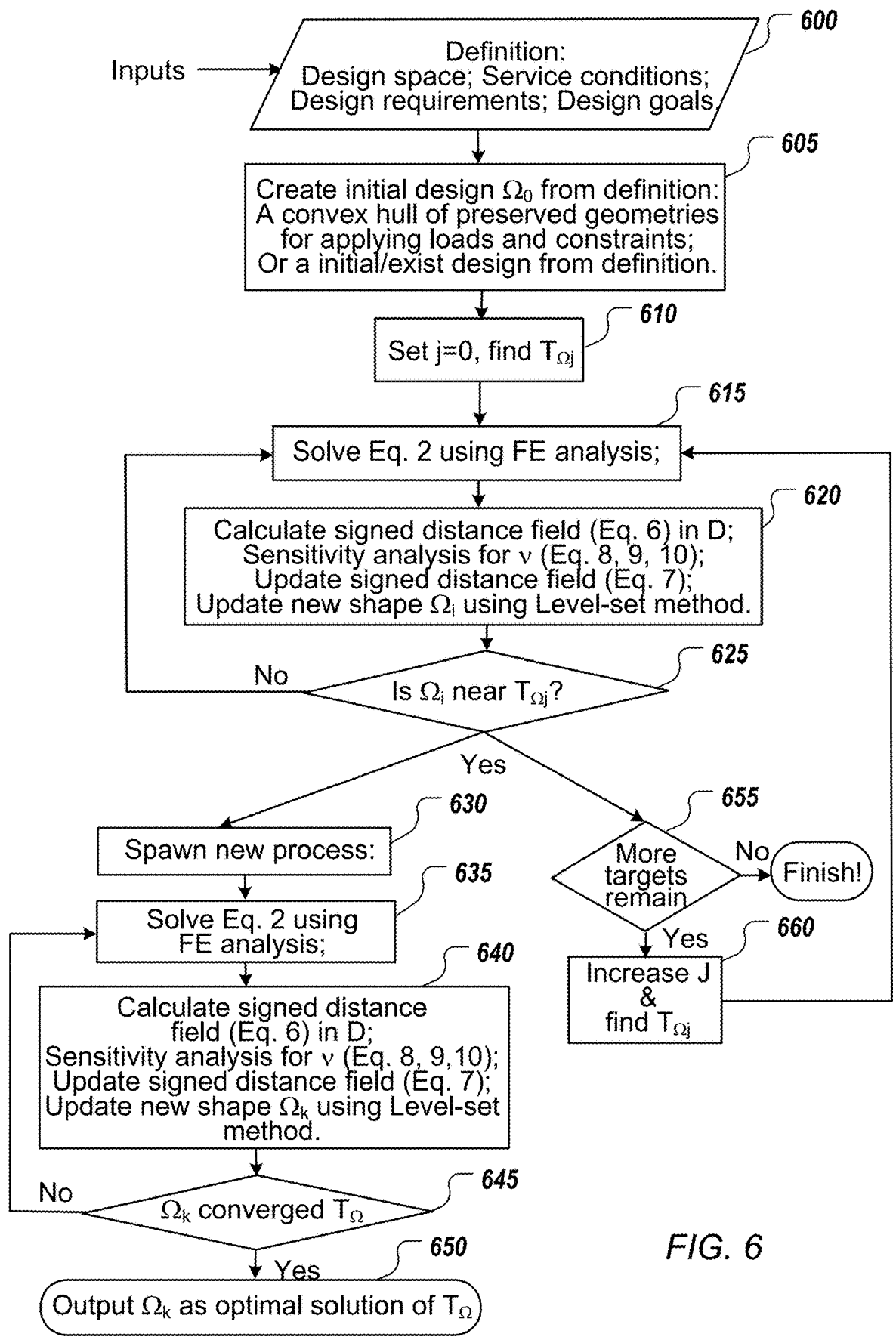
FIG. 6 shows another example of a generative design process with a multiple targets search.

FIG. 6 shows another example of a generative design process with a multiple targets search. Inputs are received 600, including the defined design space, the specified service conditions, and design requirements and/or design goals. An initial design, $\Omega_0$, is created 605, e.g., from a convex hull of preserved geometries for applying loads and constraints, or an initial/existing design provided by a user or other party. A target iteration variable, j, is set to zero and an initial target, $T_{\Omega j}$, is found 610. Equation 2 is solved 615 using FEA. The signed distance field is calculated (equation 6 in D), sensitivity analysis is performed for v (equations 8, 9 and 10), the signed distance field is updated (equation 7), and the new shape, $\Omega_i$, is updated using the level-set method 620. A check to see if the shape, $\Omega_i$, is near convergence to $T_{\Omega j}$ is then performed 625. If not, the process repeats 615, e.g., with a new recursive procedure call, until the check 625 is satisfied.

Note that the "nearness" in this context is a convergence criteria. Thus, this check can involve checking the compliance variation, Safety factor, and volume reduction, and the target can be considered achieved if all of the following criteria satisfied: (1) the compliance variation/compliance<a small % (e.g., less than 5%, less than 3%, or less than 1%); (2) for targets of safety-factors, (safety-factor−target-safetyfactor)/target-safety-factor<a small % % (e.g., less than 5%, less than 3%, or less than 1%); and (3) for targets of volume-reductions, (volume-reduction−target-volume-reduction)/target-volume-reduction<a small % (e.g., less than 5%, less than 3%, or less than 1%).

Once the shape, $\Omega_i$, is near convergence to $T_{\Omega_j}$, a new process is spawned 630 to continue processing the intermediate shape, $\Omega_i$, to find a final shape, $\Omega_k$, for the now fixed value of j. Equation 2 is solved 635 using FEA. The signed distance field is calculated (equation 6 in D), sensitivity analysis is performed for v (equations 8, 9 and 10), the signed distance field is updated (equation 7), and the new shape, $\Omega_k$, is updated using the level-set method 640. A check for convergence to $T_\Omega$ is then performed 645. This spawned process repeats 635, e.g., with a new recursive procedure call, until convergence is reached, and a new output shape, $\Omega_k$, is provided 650 as the optimal solution for $T_\Omega$. In addition, a check is made 655 (in the original process) to see if all optimal targets have been solved. If not, j is increased by one, and a next target, $T_{\Omega_j}$, is found 660, before the process repeats 615, e.g., with a new recursive procedure call, using the intermediate shape, $\Omega_i$, produced at 625 as the starting point for the next iteration, rather than the final shape, $\Omega_k$, produced at 645.

Note that the reason for using an intermediate design as the starting point for the next iteration, rather than the final design, relates to stress distribution and resolution calculations. When the final resolution is reached for a final design, the mesh for the design should be refined. Due to the Poisson's ratio (e.g., of different materials) and the fact that the mesh density increases the closer the process is to convergence, the process takes longer to run the farther along it gets toward convergence. Thus, when initiating the process with a different material and/or a different safety factor, it is preferable to go back to using a courser resolution grid, so as to speed up the process overall. Note that mesh refinement presents a cost-accuracy issue, and a mesh refinement scheme can be used to maintain the number of elements in the reducing domain to be no less than a given number. Other mesh refinement schemes can be used.

Returning again to FIG. 2, regardless of the details of how the different targets are solved to generate the corresponding 3D model designs, the two or more 3D model designs produced by the generative design processes is provided for assessment for use in manufacturing the physical structure. For example, each of the two or more (multiple) designs can be presented 235 on a display device, e.g., display device 120, for review by a user, e.g., user 190. The selection by the user of at least one of the different designs for the modeled object to be built can be received 240. The selected design(s) can then be processed, stored, or sent to another computer for processing for use in generating instructions for manufacturing the physical structure modeled by the generatively designed object.

For example, instructions for a manufacturing system can be generated 245. The manufacturing system can be an AM system and/or an SM system, as described above, and the generating 245 can include generating computer-numerical-control instructions, e.g., toolpath specification, for the AM system and/or the SM system in accordance with the selected design. The generated instructions can be output 250 for use in the manufacturing system to build the physical structure of the modeled object. Moreover, the physical structure of the modeled object can be built 255 using the generated instructions.

Figure 7:
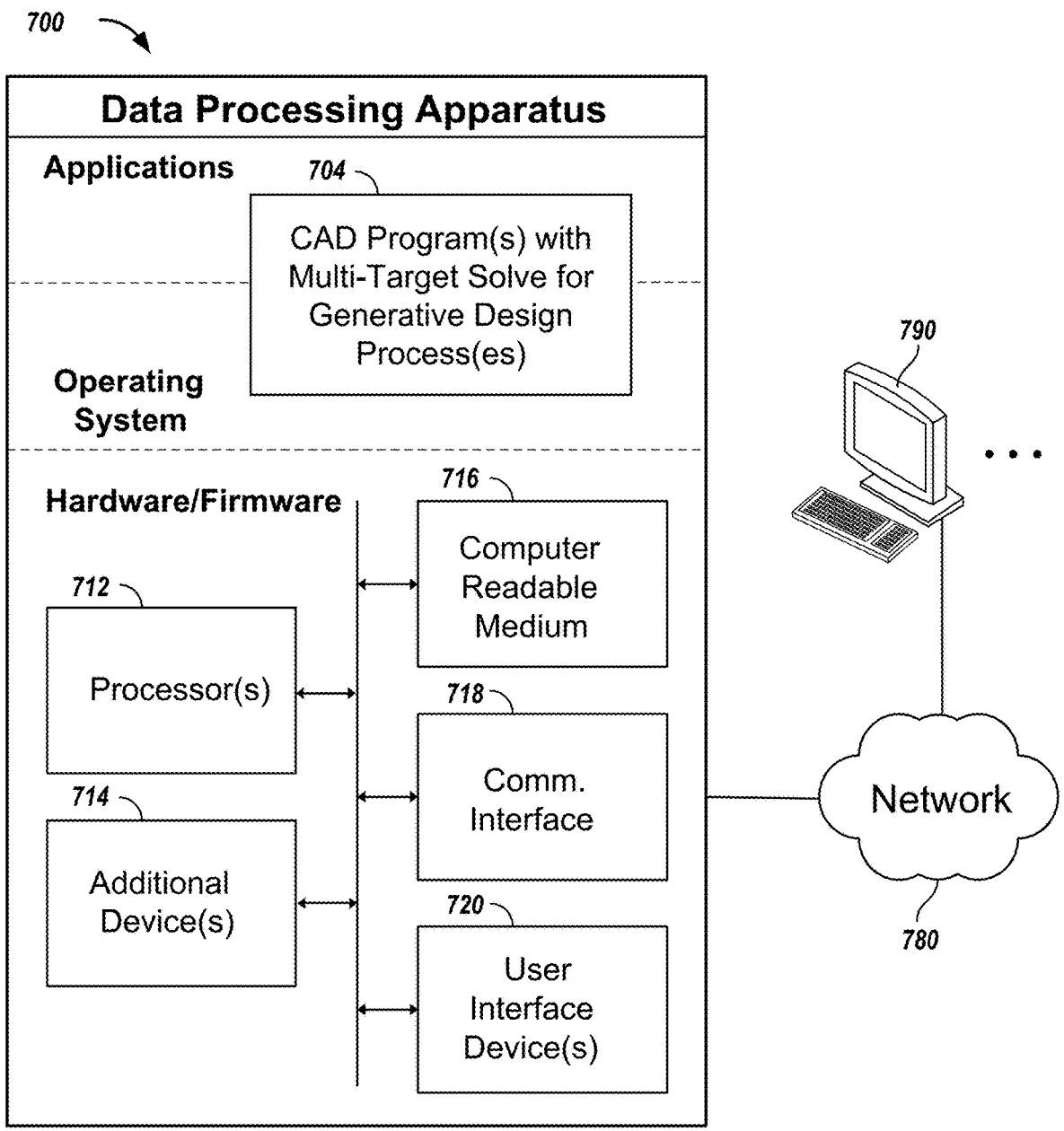
FIG. 7 is a schematic diagram of a data processing system including a data processing apparatus, which can be programmed as a client or as a server to implement the systems and techniques described.

FIG. 7 is a schematic diagram of a data processing system including a data processing apparatus 700, which can be programmed as a client or as a server to implement the systems and techniques described. The data processing apparatus 700 is connected with one or more computers 790 through a network 780. While only one computer is shown in FIG. 7 as the data processing apparatus 700, multiple computers can be used. The data processing apparatus 700 includes various software modules, which can be distributed between an applications layer and an operating system. These can include executable and/or interpretable software programs or libraries, including tools and services of one or more 3D modeling programs 704 that implement the systems and techniques described above. Thus, the 3D modeling program(s) 704 can be CAD program(s) 704 and can include a multi-target solve for one or more generative design processes that employ FEA and potentially other physical simulation methods. Further, the program(s) 704 can also implement manufacturing control operations (e.g., generating and/or applying toolpath specifications to effect manufacturing of designed objects). The number of software modules used can vary from one implementation to another. Moreover, the software modules can be distributed on one or more data processing apparatus connected by one or more computer networks or other suitable communication networks.

The data processing apparatus 700 also includes hardware or firmware devices including one or more processors 712, one or more additional devices 714, a computer readable medium 716, a communication interface 718, and one or more user interface devices 720. Each processor 712 is capable of processing instructions for execution within the data processing apparatus 700. In some implementations, the processor 712 is a single or multi-threaded processor. Each processor 712 is capable of processing instructions stored on the computer readable medium 716 or on a storage device such as one of the additional devices 714. The data processing apparatus 700 uses the communication interface 718 to communicate with one or more computers 790, for example, over the network 780. Examples of user interface devices 720 include a display, a camera, a speaker, a microphone, a tactile feedback device, a keyboard, a mouse, and VR and/or AR equipment. The data processing apparatus 700 can store instructions that implement operations associated with the program(s) described above, for example, on the computer readable medium 716 or one or more additional devices 714, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that produces an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

What is claimed is:

1. A method comprising:

obtaining, by a computer aided design program, a design space for a modeled object, for which a corresponding physical structure will be manufactured, design criteria for the modeled object, at least one in-use load case for the modeled object, at least one specification of material from which the physical structure will be built, and two or more factors of safety, wherein each of the two or more factors of safety is a constraint to limit a maximum stress in the modeled object;

producing, by the computer aided design program, at least one generatively designed three dimensional topology of the modeled object in accordance with the design criteria, the at least one in-use load case, the at least one specification of material, the two or more factors of safety, and an initial design within the design space for the modeled object, wherein the producing comprises:

starting from the initial design, generating a first design comprising a first computer aided design model of one or more first outer shapes of the at least one generatively designed three dimensional topology in accordance with a first target defined by a first of the two or more factors of safety, and starting from the first design or an intermediate design generated between the initial design and the first design, generating a second design comprising a second computer aided design model of one or more second outer shapes of the at least one generatively designed three dimensional topology in accordance with a second target defined by a second of the two or more factors of safety; and providing, by the computer aided design program, both the first design and the second design of the modeled object for assessment for use in manufacturing the physical structure.

2. The method of claim 1, wherein the obtaining comprises obtaining two or more specifications of different materials, and the producing comprises generating at least four different designs in accordance with at least four different targets, wherein:

the at least four different designs comprise the first design, the second design, a third design, and a fourth design, the at least four different targets comprise the first target, the second target, a third target, and a fourth target, the first design is generated from the initial design in accordance with the first target defined by the first of the two or more factors of safety and a first of the two or more specifications of different materials, the second design is generated from the first design, or the intermediate design, in accordance with the second target defined by the second of the two or more factors of safety and the first of the two or more specifications of different materials, the third design is generated from the second design, or a second intermediate design, in accordance with the third target defined by the first of the two or more factors of safety and a second of the two or more specifications of different materials, and the fourth design is generated from the third design, or a third intermediate design, in accordance with the fourth target defined by the second of the two or more factors of safety and the second of the two or more specifications of different materials; and wherein the method comprises ordering the targets in the at least four different targets, which are used in the producing, in accordance with combinations of values of the two or more specifications of different materials and the two or more factors of safety.

3. The method of claim 2, wherein the targets are greater than four, and a number of the targets is determined by a number of the different materials times a number of the factors of safety plus a target volume.

4. The method of claim 2, wherein each design in the at least four different designs, other than the first design, is generated from a corresponding intermediate design generated during the producing.

5. The method of claim 4, wherein the producing comprises:

checking, in each of multiple iterations of a generative design process effected by the producing, whether a current design is within a threshold distance of convergence to a final design of the at least four different designs for a current target of the at least four different targets;

continuing iterative modification of the current design toward the final design for the current target in the generative design process when the current design is not within the threshold distance;

spawning a separate process when the current design is within the threshold distance, wherein the generative design process effected by the producing continues in the separate process until convergence to the final design is achieved for the current target; and initiating the generative design process effected by the producing for a next target of the at least four different targets while more targets remain.

6. The method of claim 4, wherein the generative design process is a boundary based generative design process that employs a level-set representation of the current design.

7. The method of claim 4, comprising producing the initial design from one or more predefined geometries identified for the modeled object, wherein the one or more predefined geometries are associated with the at least one in-use load case for the modeled object.

8. The method of claim 4, wherein the providing comprises:

presenting each of the at least four different designs on a display device;

receiving selection of at least one of the at least four different designs;

generating computer-numerical-control instructions for an additive manufacturing system or a subtractive manufacturing system in accordance with the selected design; and outputting the computer-numerical-control instructions for building the physical structure using the additive manufacturing system or the subtractive manufacturing system.

9. A non-transitory computer-readable medium encoding a computer aided design program operable to cause one or more data processing apparatus to perform operations comprising:

obtaining, by a computer aided design program, a design space for a modeled object, for which a corresponding physical structure will be manufactured, design criteria for the modeled object, at least one in-use load case for the modeled object, at least one factor of safety, and two or more specifications of different materials from which the physical structure will be built, wherein the at least one factor of safety is at least one constraint to limit a maximum stress in the modeled object;

producing, by the computer aided design program, at least one generatively designed three dimensional topology of the modeled object in accordance with the design criteria, the at least one in-use load case, the at least one factor of safety, the two or more specifications of different materials, and an initial design within the design space for the modeled object, wherein the producing comprises:

starting from the initial design, generating a first design comprising a first computer aided design model of one or more first outer shapes of the at least one generatively designed three dimensional topology in accordance with a first target defined by a first of the two or more specifications of different materials, and starting from the first design or an intermediate design generated between the initial design and the first design, generating a second design comprising a second computer aided design model of one or more second outer shapes of the at least one generatively designed three dimensional topology in accordance with a second target defined by a second of the two or more specifications of different materials; and providing, by the computer aided design program, both the first design and the second design of the modeled object for assessment for use in manufacturing the physical structure.

10. The non-transitory computer-readable medium of claim 9, wherein the obtaining comprises obtaining two or more factors of safety, and the producing comprises generating at least four different designs in accordance with at least four different targets, wherein:

the at least four different designs comprise the first design, the second design, a third design, and a fourth design, the at least four different targets comprise the first target, the second target, a third target, and a fourth target, the first design is generated from the initial design in accordance with the first target defined by the first of the two or more specifications of different materials and a first of the two or more factors of safety, the second design is generated from the first design, or the intermediate design, in accordance with the second target defined by the second of the two or more specifications of different materials and the first of the two or more factors of safety, the third design is generated from the second design, or a second intermediate design, in accordance with the third target defined by the first of the two or more specifications of different materials and a second of the two or more factors of safety, and the fourth design is generated from the third design, or a third intermediate design, in accordance with the fourth target defined by the second of the two or more specifications of different materials and the second of the two or more factors of safety; and wherein the method comprises ordering the targets in the at least four different targets, which are used in the producing, in accordance with combinations of values of the two or more specifications of different materials and the two or more factors of safety.

11. The non-transitory computer-readable medium of claim 10, wherein the targets are greater than four, and a number of the targets is determined by a number of the different materials times a number of the factors of safety plus a target volume.

12. The non-transitory computer-readable medium of claim 10, wherein each design in the at least four different designs, other than the first design, is generated from a corresponding intermediate design generated during the producing.

13. The non-transitory computer-readable medium of claim 12, wherein the producing comprises:

checking, in each of multiple iterations of a generative design process effected by the producing, whether a current design is within a threshold distance of convergence to a final design of the at least four different designs for a current target of the at least four different targets;

continuing iterative modification of the current design toward the final design for the current target in the generative design process when the current design is not within the threshold distance;

spawning a separate process when the current design is within the threshold distance, wherein the generative design process effected by the producing continues in the separate process until convergence to the final design is achieved for the current target; and initiating the generative design process effected by the producing for a next target of the at least four different targets while more targets remain.

14. The non-transitory computer-readable medium of claim 12, wherein the generative design process is a boundary based generative design process that employs a level-set representation of the current design.

15. The non-transitory computer-readable medium of claim 12, the operations comprising producing the initial design from one or more predefined geometries identified for the modeled object, wherein the one or more predefined geometries are associated with the at least one in-use load case for the modeled object.

16. The non-transitory computer-readable medium of claim 12, wherein the providing comprises:

presenting each of the at least four different designs on a display device;

receiving selection of at least one of the at least four different designs;

generating computer-numerical-control instructions for an additive manufacturing system or a subtractive manufacturing system in accordance with the selected design; and outputting the computer-numerical-control instructions for building the physical structure using the additive manufacturing system or the subtractive manufacturing system.

17. A system comprising:

one or more non-transitory storage mediums having instructions of a computer aided design program stored thereon; and one or more data processing apparatus configured to run the instructions of the computer aided design program to perform operations comprising:

obtaining a design space for a modeled object, for which a corresponding physical structure will be manufactured, design criteria for the modeled object, at least one in-use load case for the modeled object, two or more specifications of different materials from which the physical structure will be built, and two or more factors of safety, wherein each of the two or more factors of safety is a constraint to limit a maximum stress in the modeled object, ordering targets, including a first target, a second target and additional targets, defined in accordance with the two or more factors of safety and the two or more specifications of different materials, producing at least one generatively designed three dimensional topology of the modeled object in accordance with the design criteria, the at least one in-use load case, the two or more specifications of different materials, the two or more factors of safety, and an initial design within the design space for the modeled object, wherein the producing comprises:

starting from the initial design, generating a first design comprising a first computer aided design model of one or more first outer shapes of the at least one generatively designed three dimensional topology in accordance with the first target, starting from the first design or an intermediate design generated between the initial design and the first design, generating a second design comprising a second computer aided design model of one or more second outer shapes of the at least one generatively designed three dimensional topology in accordance with the second target, and iteratively generating, starting from a last design or an intermediate design obtained before the last design, additional designs comprising additional computer aided design models of outer shapes of the at least one generatively designed three dimensional topology in accordance with the additional targets, and providing at least one of the generated designs of the modeled object for use in manufacturing the physical structure.

18. The system of claim 17, wherein each generated design, other than the first design, is generated from a corresponding intermediate design generated during the producing.

19. The system of claim 18, wherein the producing comprises:

checking, in each of multiple iterations of a generative design process effected by the producing, whether a current design is within a threshold distance of convergence to a final design for a current target;

continuing iterative modification of the current design toward the final design for the current target in the generative design process when the current design is not within the threshold distance;

spawning a separate process when the current design is within the threshold distance, wherein the generative design process effected by the producing continues in the separate process until convergence to the final design is achieved for the current target; and initiating the generative design process effected by the producing for a next target while more targets remain.

20. The system of claim 19, wherein the providing comprises saving a selected design of the generated designs to a permanent storage device for use in manufacturing the physical structure, or generating computer-numerical-control instructions for an additive manufacturing system or a subtractive manufacturing system in accordance with the selected design.

21. The system of claim 20, comprising the additive manufacturing system or the subtractive manufacturing system, and the operations further comprise manufacturing the physical structure with the additive manufacturing system or the subtractive manufacturing system using the computer-numerical-control instructions.

* * * * *

UNITED STATES PATENT AND TRADEMARK OFFICE
CERTIFICATE OF CORRECTION

PATENT NO. : 11,288,417 B2
APPLICATION NO. : 16/392154
DATED : March 29, 2022
INVENTOR(S) : Huagang Yu and Justin Nicholas Hallet It is certified that error appears in the above-identified patent and that said Letters Patent is hereby corrected as shown below:

In the Claims

Column 24, Line 39, in Claim 6: please delete "claim 4" and insert --claim 5--, therefor.

Column 25, Line 61, in Claim 10: please delete "wherein the method comprises" and insert --wherein the operations comprise--, therefor.

Column 26, Line 31, in Claim 14: please delete "claim 12" and insert --claim 13--, therefor.

Signed and Sealed this
Thirteenth Day of September, 2022

*Katherine Kelly Vidal*

Katherine Kelly Vidal
*Director of the United States Patent and Trademark Office*